Patented Apr. 20, 1926.

1,581,475

UNITED STATES PATENT OFFICE.

JOHN F. SANDERS, OF ROSEBURG, OREGON.

PROCESS OF EXTRACTING ARSENIDE FROM ORES.

No Drawing.   Application filed April 22, 1925. Serial No. 25,148.

*To all whom it may concern:*

Be it known that I, JOHN F. SANDERS, a citizen of the United States, residing at Roseburg, in the county of Douglas and the State of Oregon, have invented new and useful Improvements in the Process of Extracting Arsenide from Ores, of which the following is a specification.

This invention relates to the extraction of or removal of the contaminating arsenic, when it occurs as in the mineral sperrylite, which is a platinum diarsenide, $PtAs_2$. Dana in his book on mineralogy, page 302, under the subject of sperrylite, states "Platinum is the only known metal forming a native compound." Therefore, the contaminating arsenic exists also in the native state, and is hence easily dissolved in carbon bisulphide. (See Roscoe & Schorlemmer, Vol. I. page 585.) The same solvent will also dissolve arsenical oxides, but it will not dissolve arsenical sulphides in any combination with metals or otherwise. The removal of the contaminating arsenic, when occurring as the platinum diarsenide, is very important because the arsenic in that combination, as well as by itself, when subjected to a temperature of 450 degrees C. or more, as in roasting or smelting, turns at once from the solid state into the gaseous state and induces the platinum to do likewise; but in this gaseous state many reactions take place, resulting in the formation of cyanogen compounds, better known as the radical compounds, such as carbonyl, platinyl, arsenyl, etc., all of which can only be condensed in very low temperatures and hence escape into the atmosphere as a total loss. Again, in pulverizing ores that contain platinum diarsenides which are very brittle, breaking up into extremely small particles which float off in attempting to concentrate them, the platinum is again lost. In amalgamation the arsenic prevents the success of that operation. In other words, the arsenic is a very obnoxious contamination in such ores that contain it in the condition above stated. The object of this invention is to extract this contaminating arsenic from such ores that contain it, by subjecting such ores to a process of lixiviation with carbon bisulphide.

To carry the process into effect, it is necessary to reduce the arsenic contaminated ores to a pulverulent condition, in order to free the arsenic contaminated metals from all adherent gangue and other matter enclosing them; then submitting these pulverized ores, with constant agitation, to the solving action of pure carbon bisulphide until all of such contaminating arsenic has been dissolved. This solvent has no effect on any of the native metals, nor any effect on any metallic sulphides, but leaves all of them in the same condition as they were before the ores were subjected to the lixiviation of the contaminant arsenic.

The arsenic is now held in solution by the solvent and may be drained off from the ores or may be separated from them by filtration as may be desired. The arsenic may be recovered by heating the solution containing it to about 135 degrees, when the carbon bisulphide will evaporate, leaving the arsenic in a pure solid state.

The precious metals, that were, previous to the lixiviation, associated with the arsenic, are now entirely free from it and may now be successfully extracted by the well known processes, such as amalgamation, roasting, but not by smelting, for the reason that the fuel gases produce the obnoxious cyanogen compound radicals, and the precious metals, especially platinum, are all easily evaporated by it and lost, as before stated.

It must be remembered that carbon bisulphide is very inflammable and a powerful poison, and that wherever it is used good ventilation should be provided.

Having thus described my invention, what I claim is:

The process of preparing arsenic-contaminated ores for the extraction of the desired metal contents, consisting in subjecting such arsenic contaminated ores in pulverulent condition, with agitation, to a solvent, consisting substantially and wholly of carbon bisulphide until the arsenic contaminants are dissolved, substantially as described.

In witness whereof I have hereunto subscribed my name.

JOHN F. SANDERS.